US011531836B2

(12) United States Patent
Feng et al.

(10) Patent No.: US 11,531,836 B2
(45) Date of Patent: Dec. 20, 2022

(54) METHOD, DEVICE, AND MEDIUM FOR DATA PROCESSING

(71) Applicant: NEC CORPORATION, Tokyo (JP)

(72) Inventors: Lu Feng, Beijing (CN); Lvye Cui, Beijing (CN); Wenjuan Wei, Beijing (CN); Chunchen Liu, Beijing (CN)

(73) Assignee: NEC CORPORATION, Tokyo (JP)

( * ) Notice: Subject to any disclaimer, the term of this patent is extended or adjusted under 35 U.S.C. 154(b) by 420 days.

(21) Appl. No.: 16/856,675

(22) Filed: Apr. 23, 2020

(65) Prior Publication Data

US 2020/0342262 A1 Oct. 29, 2020

(30) Foreign Application Priority Data

Apr. 24, 2019 (CN) .......................... 201910335036.8

(51) Int. Cl.
*G06K 9/62* (2022.01)
*G06N 7/00* (2006.01)
*G06V 10/75* (2022.01)

(52) U.S. Cl.
CPC ......... *G06K 9/6256* (2013.01); *G06K 9/6296* (2013.01); *G06N 7/005* (2013.01); *G06V 10/751* (2022.01)

(58) Field of Classification Search
CPC .. G06K 9/6256; G06K 9/6296; G06K 9/6226; G06N 7/005; G06N 20/00; G06V 10/751; G06Q 30/0201
USPC ......................................................... 706/12
See application file for complete search history.

(56) References Cited

U.S. PATENT DOCUMENTS

| 8,275,723 | B2 * | 9/2012 | Barnhill | G06T 7/0012 |
| | | | | 706/13 |
| 2008/0097939 | A1 * | 4/2008 | Guyon | G06N 20/10 |
| | | | | 706/12 |
| 2008/0215513 | A1 * | 9/2008 | Weston | G06N 20/10 |
| | | | | 706/13 |
| 2018/0096229 | A1 * | 4/2018 | Bronstein | G06N 3/0481 |

\* cited by examiner

*Primary Examiner* — Neil R McLean
(74) *Attorney, Agent, or Firm* — Sughrue Mion, PLLC

(57) ABSTRACT

Embodiments of the present disclosure relate to a method, a device and a computer-readable storage medium for data processing. The method for data processing comprises: obtaining a set of observation samples regarding a plurality of factors, one of the set of observation samples comprising respective observed values of the plurality of factors. The method further comprises: estimating, for each of the plurality of factors and based on the set of observation samples, a distribution that differences between observed values of the factor and estimated values of the factor follow. The method further comprises determining, based at least on the estimated distribution, a causal structure representing a causal relationship among the plurality of factors. Embodiments of the present disclosure further provide a device and a computer-readable storage medium for implementing the above method. The embodiments of the present disclosure can accurately and robustly discover the causal relationship among a plurality of factors without making any assumptions about the relationship between the data distribution and the factors, and affect the observed value of the target factor based on the causal relationship.

25 Claims, 6 Drawing Sheets

METHOD, DEVICE, AND MEDIUM FOR DATA PROCESSING

FIELD

Embodiments of the present disclosure relate to the field of machine learning, and more specifically to a method, a device and a computer-readable storage medium for data processing.

BACKGROUND

With the rapid development of information technology, the scale of data has grown rapidly. Against this background and trend, machine learning has attracted more and more attention, where causal discovery is widely applied in real life, for example, in fields such as supply chain, medical health care, retailing, and the like. The causal discovery mentioned herein refers to discovering a causal relationship among a plurality of factors from the sample data about the plurality of factors. For example, in the retailing field, the results from causal discovery can be used to assist in making various sales strategies; in the field of medical health care, the results from causal discovery can be used to assist in making treatment plans for patients, and the like.

SUMMARY

Embodiments of the present disclosure provide a method, a device and a computer-readable storage medium for data processing.

According to a first aspect of the present disclosure, there is provided a method for data processing. The method comprises: obtaining a set of observation samples regarding a plurality of factors, one of the set of observation samples comprising respective observed values of the plurality of factors; estimating, for each of the plurality of factors and based on the set of observation samples, a distribution that differences between observed values of the factor and estimated values of the factor follow, the estimated values being determined based on observed values of at least one other factor of the plurality of factors and an impact of the at least one other factor on the factor; and determining, based at least on the estimated distribution, a causal structure representing a causal relationship among the plurality of factors.

According to a second aspect of the present disclosure, there is provided a device for data processing. The device comprises at least one processing unit and at least one memory. The at least one memory is coupled to the at least one processing unit and has instructions stored thereon and executed by the at least one processing unit. The instructions, when executed by the at least one processing unit, causes the device to perform acts, the acts comprising: obtaining a set of observation samples regarding a plurality of factors, one of the set of observation samples comprising respective observed values of the plurality of factors; estimating, for each of the plurality of factors and based on the set of observation samples, a distribution that differences between observed values of the factor and estimated values of the factor follow, the estimated values being determined based on observed values of at least one other factor of the plurality of factors and an impact of the at least one other factor on the factor; and determining, based at least on the estimated distribution, a causal structure representing a causal relationship among the plurality of factors.

According to a third aspect of the present disclosure, there is provided a computer-readable storage medium having machine-executable instructions stored thereon, wherein the machine-executable instructions, when being executed by a device, cause the device to perform the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The objects, advantages and other features of the present disclosure will become more apparent from the following disclosure and claims. For illustrative purposes only, reference is made to the figures to give a non-limiting description of preferred embodiments. In the figure:

In all figures, the same or corresponding reference numbers represent the same or corresponding parts.

DETAILED DESCRIPTION OF EMBODIMENTS

Figure 1A:
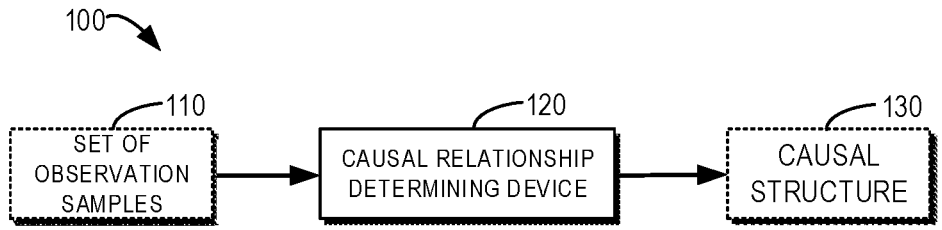
FIGS. 1A and 1B illustrate a block diagram of an example system for data processing according to embodiments of the present disclosure.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to enable the present disclosure to be understood more thoroughly and completely. It should be appreciated that the figures and embodiments of the present disclosure are for the purpose of illustration only, rather than limiting the scope of protection of the present disclosure.

In the depictions of the embodiments of the present disclosure, the term "includes" and its variants are to be read as open-ended terms that mean "includes, but is not limited to." The term "based on" is to be read as "based at least in part on." The term "one example implementation" and "an example implementation" are to be read as "at least one example implementation." Terms such as "a first" and "a second" may denote different or identical objects. The following text may also include other explicit or implicit definitions.

In the embodiments of the present disclosure, the term "causal structure" generally refers to a structure that describes a causal relationship between various factors in the system. The term "factor" is also referred to as a "variable." The term "observational samples" refers to a set of observed values of a plurality of factors that can be directly observed, where the factors that can be directly observed are also referred to as "observational variables."

As described above, in actual life, it is desirable to quickly and accurately discover the causal relationship existing among a large number of observational variables.

In the field of subscriber service, consumption behavior data (such as the age of subscribers, the Internet traffic consumed monthly, a ratio of free traffic, a total fee of the Internet traffic consumed monthly, and the like), satisfaction survey data and operator strategy data of a number of subscribers may be collected in order to determine which factors will affect the subscriber's satisfaction with telecom operators. Each type of data collected is also referred to as an observed value of a factor (or a variable). One or more factors that affect subscriber's satisfaction may be determined by discovering the causal relationship between these factors. Further, the subscriber's satisfaction with the telecommunications operator may be improved by changing the observed values of the one or more factors or making corresponding policies for the one or more factors.

In the field of health care, a series of physiological indexes (i.e., observed values of a series of factors) of a large number of patients such as heart rate, cardiac output, allergy index, total peripheral vascular resistance, Catecholamine release, blood pressure, and the like, may be collected in order to determine the factors that affect the blood pressure of patients. The physiological indexes (i.e., factors) that affect the patient's blood pressure may be determined by discovering the causal relationship between these physiological indexes. Further, the patient's blood pressure may be kept stable by affecting the physiological indexes or making a corresponding strategy for the physiological indexes.

In the field of commodity sales, external factor data (such as weather, season, temperature, date, the size of store, and the like), sales data of the commodity (e.g., the sales volume of the commodity, the price of the commodity, etc.) and sales data of one or more associated commodities (e.g., ice cream), etc. may be collected in order to determine the factors that affect the sales of a target commodity (e.g., umbrellas). Each type of data collected is regarded as an observed value of a factor. One or more factors that affect the sales of the target commodity may be determined by discovering the causal relationship between these factors. Furthermore, the sales volume of the target commodity may be improved by changing the observed values of the one or more factors or making a corresponding strategy for the one or more factors.

In the field of software development, information on various factors of software development, including but not limited to the overall information of software development (such as the development cycle, resources put into the development, and the like) and information at various stages of software development may be collected in order to determine factors that affect the failure rate and/or software development cycle. For example, the information at various stages of software development may include information at an architecture stage (such as software architecture methods, the number of levels of software architecture, and the like), information at a coding stage (such as the length of code, the number of functions, programming languages, the number of modules, and the like), information at a testing stage (such as the correct rate or failure rate of unit tests, the correct rate or failure rate of the black box test, the correct rate or failure rate of the white box test, and the like), information at a running stage after the software is released (such as the correct rate or failure rate of the running stage, and the like). Each type of data collected is regarded as observed values of a factor. One or more factors that affect the software development cycle and/or failure rate can be determined by discovering the causal relationship between these factors. Furthermore, the software development cycle and/or failure rate may be reduced by changing the observed values of the one or more factors or making a corresponding strategy for the one or more factors.

However, it is usually difficult to discover the causal relationship between a plurality of factors from only the observation data of the plurality of factors without any intervention or randomized control experiments. Therefore, the conventional method for discovering the causal relationship based on the observation data usually involves various assumptions, for example, the data distribution is Gaussian, or the relationship among factors is linear.

However, in actual applications, data may follow any distribution, and the relationship among factors may be nonlinear.

According to embodiments of the present disclosure, a solution for data processing is proposed. This solution can accurately and robustly find the causal relationship among a plurality of factors without making any assumption about the relationship between the data distribution and the factors, thereby solving the problems mentioned above and/or other potential problems. The embodiments of the present disclosure will be described in detail below in conjunction with the above-mentioned example scenarios. It should be appreciated that this is for illustrative purposes only and is not intended to limit the scope of the present disclosure in any way.

FIG. 1A illustrates an example block diagram of a system 100 for data processing according to embodiments of the present disclosure. It should be appreciated that the system 100 shown in FIG. 1A is only an example in which embodiments of the present disclosure can be implemented, and is not intended to limit the scope of the present disclosure. The embodiments of the present disclosure are also applicable to other systems or architectures.

As shown in FIG. 1A, the system 100 may include a causal relationship determining device 120. The causal relationship determining device 120 may receive a set of observation samples 110 regarding a plurality of factors, and determine therefrom a causal structure 130 representing a causal relationship among the plurality of factors. Alternatively, in some embodiments, the system 100 may further include an observation sample collecting device (not shown in FIG. 1A) for collecting the set of observation samples 110 regarding the plurality of factors. The observation sample collecting device may collect observed values of the plurality of factors in real time, periodically or non-periodically to obtain the set of observation samples 110. In some embodiments, the observation sample collecting device may include one or more collecting units for collecting observed values of different types of factors, respectively.

The set of observation samples 110 may include observation samples of a plurality of factors related to one or more target factors. For example, the set of observation samples 110 may be represented as $X=\{X_1, X_2, \ldots, X_D\} \in R^{N \times D}$, where N represents a total number of observation samples in the set of observation samples 110, D represents a total number of the factors, and each of the set of observation samples 110 includes a set of observed values of the D factors. The vector $X_i \in R^N$ ($i \in [1, D]$) represents N observed values of the $i^{th}$ factor (hereinafter also referred to as "factor i" or "factor $X_i$"). For example, $x_i^{(n)}$ ($i \in [1, D]$ and $n \in [1,$ N]) represents the $n^{th}$ observed value of the factor i. The causal structure 130 may be represented by a directed acyclic graph (DAG), where each node represents a factor, and each directed edge represents a causal relationship, for example, the edge "A→B" may represent factor A is a cause of factor B.

Taking the above scenario of subscriber satisfaction with a telecommunications operator as an example, for example, the target factor is "subscriber satisfaction", and the set of factors including D factors may include factors related to subscriber attributes (e.g., subscriber level, subscriber number, and the like), factors related to subscriber behavior (e.g., Internet traffic consumed monthly, a proportion of free traffic, a total cost of the Internet traffic consumed monthly, and the like), factors related to subscriber feedback (e.g., the number of complaints, subscriber satisfaction) and one or more of the strategic factors (e.g., the timing and number of reminders beyond the service bundle, and the like) formulated for subscribers. Taking the factor "subscriber level" as an example, the vector $X_i$ may be composed of the levels of N subscribers, and $x_i^{(n)}$ may represent the level of the $n^{th}$ subscriber among the N subscribers. Taking the factor "Internet traffic consumed monthly" (i.e., $v_i$) as an example, the vector $X_i$ may be composed of the Internet traffic consumed by N subscribers monthly, and $x_i^{(n)}$ may represent the Internet traffic consumed monthly by the $n^{th}$ subscriber in the N subscribers. For example, the causal structure 130 may indicate the causal relationship among factors such as the subscriber level, the Internet traffic consumed monthly, the proportion of free traffic, the total cost of Internet traffic consumed monthly, and subscriber satisfaction, for example, which factors are the causes of target factor "subscriber satisfaction."

Taking the above scenario regarding the patient's blood pressure as an example, for example, the target factor is "blood pressure," and the set of factors including D factors may include heart rate, cardiac output, allergy index, total peripheral vascular resistance, catecholamine release, blood pressure, and so on. Taking the factor "heart rate" as an example, the vector $X_i$ may be composed of the heart rates of N patients, and $x_i^{(n)}$ may represent the heart rate of the $n^{th}$ patient in the N patients. Taking the factor "cardiac output" as an example, the vector $X_i$ may be composed of the cardiac output of N patients, and $x_i^{(n)}$ may represent the cardiac output of the $n^{th}$ patient in the N patients. For example, the causal structure 130 may indicate a causal relationship among factors such as heart rate, cardiac output, allergy index, total peripheral vascular resistance, catecholamine release, blood pressure, and the like, for example, what factors are causes of the target factor "blood pressure."

Taking the above scenario of commodity sales as an example, for example, the target factor is "target commodity sales," and the set of factors including D factors may include one or more of: external factors (such as weather, season, temperature, date, the size of store, and the like), factors (e.g., sales volume of the target commodity, the price of the target commodity, etc.) related to the sales behaviors of the target commodity (e.g., umbrella), factors related to sales behaviors of one or more associated commodities (e.g., ice cream) and sales strategic factors for the target commodity (e.g., promotion times, frequency, and the like) Taking the factor "temperature" as an example, the vector $X_i$ may be composed of the temperature of N days, and $x_i^{(n)}$ may represent the temperature of the $n^{th}$ day. Taking the factor "target commodity sales" as an example, the vector $X_i$ may be composed of umbrella sales in N days, and $x_i^{(n)}$ may represent the umbrella sales on the $n^{th}$ day. For example, the causal structure 130 may indicate the causal relationship among factors such as weather, season, temperature, date, the size of store, target commodity sales, target commodity price, sales of associated commodities, the prices of associated commodities, and the like, for example, what factors are causes of the target factor "target commodity sales."

Taking the above scenario of software development as an example, for example, the target factor is "software development cycle" or "a failure rate in a software running stage", and the set of factors including D factors may include one or more of: overall factors (e.g., a development cycle, resources input into development, and the like) of software development and factors in various stages of software development. For example, the factors in various stages of the software development may include factors at an architecture stage (such as software architecture methods, the number of levels of software architecture, and the like), factors at a coding stage (such as the length of code, the number of functions, programming languages, the number of modules, and the like), factors at a testing stage (such as the correct rate or failure rate of unit tests, the correct rate or failure rate of the black box test, the correct rate or failure rate of the white box test, and the like), factors at a running stage after the software is released (such as the correct rate or failure rate of the running stage, and the like) Taking the factor "development cycle" as an example, the vector $X_i$ may be composed of development cycles of N software products, and $x_i^{(n)}$ may represent the development cycle of the $n^{th}$ software product. Taking the factor "length of code" as an example, the vector $X_i$ may be composed of the lengths of codes of N software products, and $x_i^{(n)}$ may represent the length of code of the $n^{th}$ software product. For example, the causal structure 130 may indicate the causal relationship among factors such as the software development cycle, the input resources for development, the architecture method, the number of levels of architecture, the length of code, the number of functions, the programming language, the number of modules, the correct rate or failure rate of unit tests, the correct rate or failure rate of the black box test, the correct rate or failure rate of the white box test, the correct rate of the running stage and the failure rate of the running stage. For example, which factors are causes of the target factor "development cycle," which factors are causes of the target factor "the failure rate of the running phase," and so on.

Alternatively, in some embodiments, the system 100 may further include a causal relationship presentation device (not shown in FIG. 1A) for presenting the representation of the causal structure 130. In some embodiments, the causal relationship presentation device may present the representation of the causal structure 130 in different manners such as a visual or auditory manner. For example, the causal relationship presentation device may present the causal structure 130 in the form of graphs, charts, texts, and so on. In some embodiments, the causal relationship presentation device may present the representation of the entirety of the causal structure 130, namely, the causal relationship among all factors. Alternatively, in some embodiments, the causal relationship presentation device may only present the representation of a portion of the causal structure 130, for example, the causal relationship associated with one or more target factors. In some embodiments, when the cause of the target factor includes a plurality of factors, the causal relationship presentation device may further present respective degrees of importance of the plurality of factors, for example, presenting different degrees of importance in different manners such as in different colors and/or numerical values. The embodiments of the present disclosure are not limited in this regard.

Figure 1B:
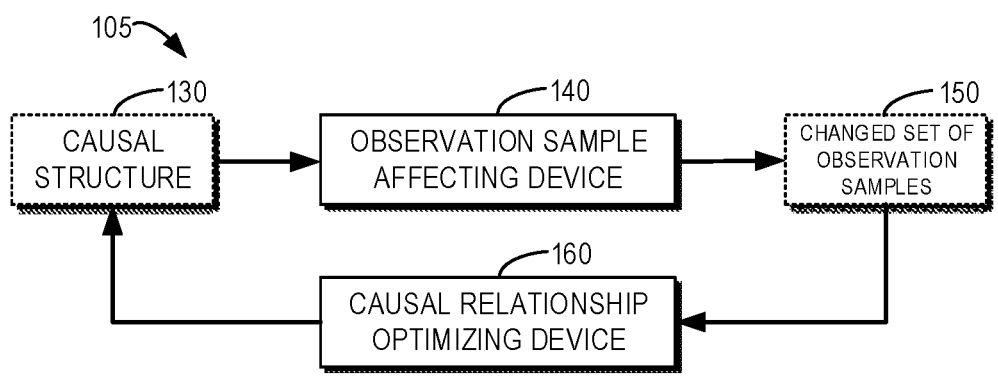

FIG. 1B illustrates an example block diagram of a system 105 for data processing according to embodiments of the present disclosure. For example, the system 105 may apply and optimize the causal structure 130 shown in FIG. 1A. It should be appreciated that the system 105 shown in FIG. 1B is only an example in which embodiments of the present disclosure can be implemented, and is not intended to limit the scope of the present disclosure. The embodiments of the present disclosure are also applicable to other systems or architectures.

As shown in FIG. 1B, the system 105 may include an observation sample affecting device 140. The observation sample affecting device 140 may determine, based on the causal structure 130 and from a plurality of factors, at least one factor as a cause of the target factor. The observation sample affecting device 140 may affect the observed value of the target factor by changing the observed values of at least one factor, thereby obtaining the changed set of observation samples 150. At least one of the changed set of observation samples 150 includes the changed observed values of at least one factor.

Taking the above scenario of subscriber satisfaction with a telecommunications operator as an example, for example, the target factor is "subscriber satisfaction", and the causal structure 130 for example may indicate which factors (e.g., a reminder before the service bundle runs out, benefit service bundle, and the like) as a cause of the target factor "subscriber satisfaction." For example, the observation sample affecting device 140 may improve the subscriber's satisfaction with the telecommunications provider by affecting and changing the observed values of these factors, and/or making corresponding policies (e.g., providing more reminders to the subscriber before the service bundle runs out, or providing more discount service bundles to the subscriber) with respect to these factors.

Taking the above scenario regarding the patient's blood pressure as an example, for example, the target factor is "blood pressure," and the causal structure 130 for example may indicate which physiological indexes are causes of the target factor "blood pressure." For example, the observation sample affecting device 140 may make the patient's blood pressure remain stable by affecting and changing these physiological indexes, and/or making corresponding polices with respect to these physiological indexes.

Taking the above scenario of commodity sales as an example, for example, the target factor is "umbrella sales," and the causal structure 130 for example may indicate which factors (e.g., weather, the number of umbrellas for sale, and the like) are causes of the target factor "umbrella sales." For example, the observation sample affecting device 140 may improve the sales volume of the target commodity umbrella by affecting and changing these factors, and/or making corresponding polices (e.g., increasing the number of umbrellas for sale when it rains) with respect to these factors.

Taking the above scenario of software development as an example, the target factor for example is "development cycle," and the causal structure 130 for example may indicate which factors (e.g., the number of levels of architecture, programming language, and the like) are causes of the target factor "development cycle." For example, the observation sample affecting device 140 may reduce the software development cycle by affecting and changing these factors, and/or making corresponding polices (e.g., reducing the complexity of the software architecture, using more friendly programming language, and the like) with respect to these factors. Again for example, the target factor may be "the failure rate of software in the running stage," and the causal structure 130 for example may indicate which factors (e.g., the length of code, the number of modules, and the like) are causes of the target factor "the failure rate of software in the running stage." For example, the observation sample affecting device 140 may reduce the failure rate of software in the running stage by affecting and changing these factors, and/or making corresponding polices (e.g., reducing the length of code, and decreasing the number of modules, and the like) with respect to these factors.

As shown in FIG. 1B, the system 105 may include a causal relationship optimizing device 160. The causal relationship optimizing device 160 may optimize the causal structure 130 based on the changed set of observation samples 150, thereby improving the accuracy of the causal structure 130. In some embodiments, the causal relationship optimizing device 160 may rediscover the causal relationship among the plurality of factors based on the changed set of observation samples 150 (e.g., similar to the process performed by the causal relationship determining device 120), thereby obtaining an optimized causal structure. In this way, according to the embodiments of the present disclosure, the accuracy and robustness of causal discovery can be further improved.

Although the causal relationship determining device 120 shown in FIG. 1A, the observation sample affecting device 140 and causal relationship optimizing device 160 shown in FIG. 1B are shown as being separated from each other, it should be appreciated that this is for illustrative purposes only and not intended to limit the scope of this disclosure. In some embodiments, the causal relationship determining device 120 shown in FIG. 1A, the observation sample affecting device 140 and causal relationship optimizing device 160 shown in FIG. 1B may be implemented in the same physical device or a plurality of different physical devices. In some embodiments, the causal relationship determining device 120 shown in FIG. 1A and the causal relationship optimizing device 160 shown in FIG. 1B may be implemented as the same device. The embodiments of the present disclosure are not limited in this regard.

Figure 2:
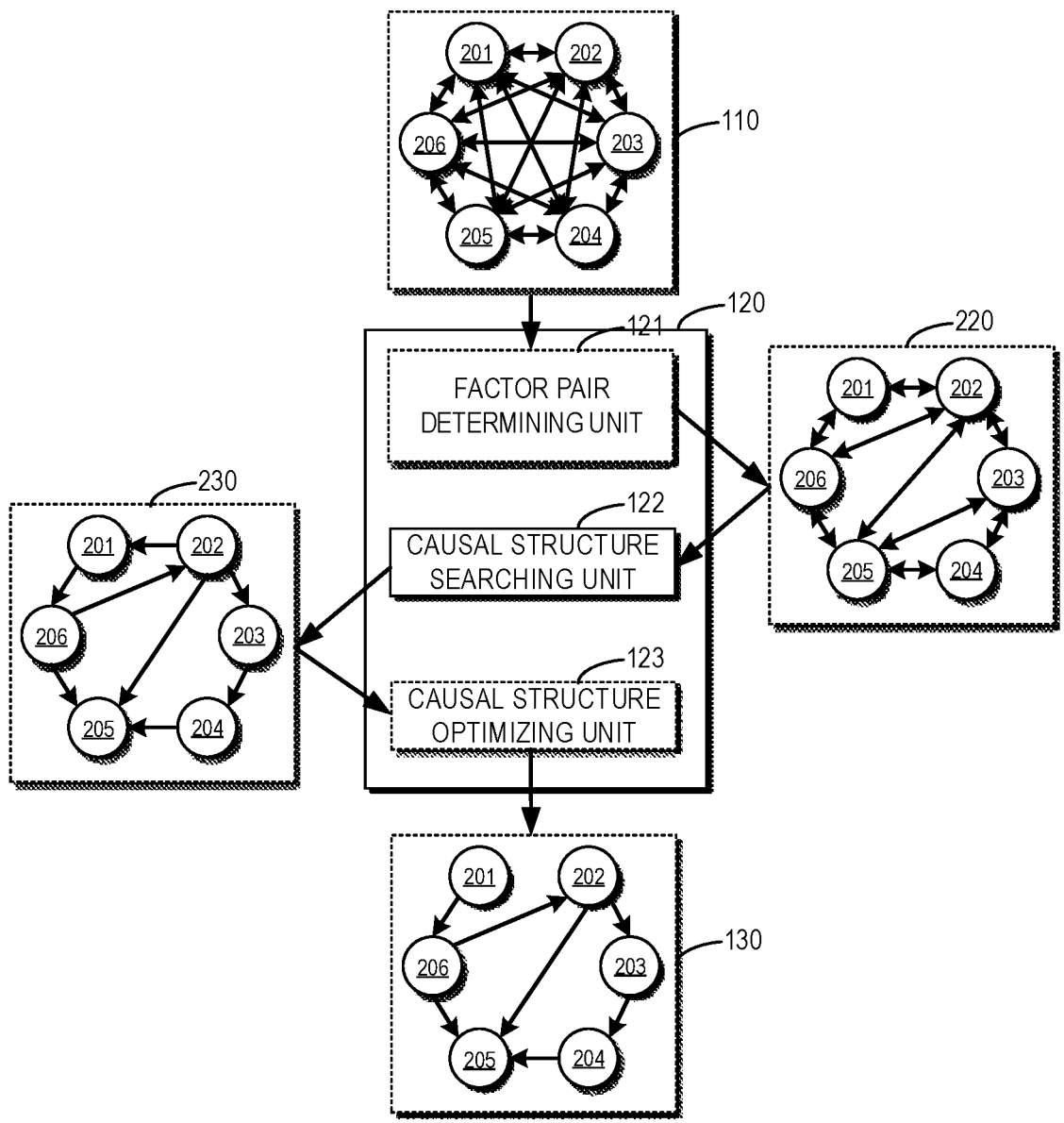
FIG. 2 illustrates a schematic diagram for determining a causal relationship among a plurality of factors according to embodiments of the present disclosure.

FIG. 2 illustrates a schematic diagram for determining a causal relationship among a plurality of factors according to embodiments of the present disclosure. For the purpose of simplicity and ease of illustration, it is assumed in FIG. 2 that the set of observation samples 110 involves six factors 201, 202, 203, 204, 205 and 206, that is, the number of factors D is six.

As shown in FIG. 2, the causal relationship determining device 120 for example may include a factor pair determining unit 121, a causal structure searching unit 122, and a causal structure optimizing unit 123. It should be appreciated that the units included in the causal relationship determining device 120 are merely for the purpose of illustration, and are not intended to limit the scope of the present disclosure. In some embodiments, the causal relationship determining device 120 may further include additional units not shown and/or some units shown may be omitted. For example, in some embodiments, the factor pair determining unit 121 and/or the causal structure optimizing unit 123 may be omitted.

The set of observation samples 110 includes a plurality of observation samples regarding the factors 201, 202, 203, 204, 205 and 206. In the initial situation, as shown in the set of observation samples 110 in FIG. 2, there may be a causal relationship between any two factors.

In some embodiments, the set of observation samples 110 may be input to the factor pair determining unit 121 to determine a factor pair that may be in a causal relationship among the plurality of factors 201, 202, 203, 204, 205 and 206. It should be appreciated that the factor pair determining unit 121 may determine the factor pair that may be in a causal relationship among the plurality of factors 201, 202, 203, 204, 205 and 206 by any known or future-developed method. It is assumed herein that a plurality of factor pairs that may be in a causal relationship determined for the plurality of factors 201, 202, 203, 204, 205 and 206 are shown by 220 in FIG. 2.

In some embodiments, when the plurality of factor pairs 220 are determined, both the plurality of factor pairs 220 and the set of observation samples 110 may be input into the causal structure searching unit 122 to determine the causal relationship between each factor pair in the plurality of factor pairs 220 (i.e., one factor is a cause of another factor). It should be appreciated that not each of the plurality of factor pairs 220 is in the causal relationship. The causal structure searching unit 122 may output the searched causal structure 230 (hereinafter also referred to as "DAG 230").

Alternatively, in some embodiments, the factor pair determining unit 121 may be omitted. In this case, the set of observation samples 110 may be input directly to the causal structure searching unit 122. The causal structure searching unit 122 may determine a causal relationship between two factors in a factor pair composed of any two factors in the plurality of factors 201, 202, 203, 204, 205 and 206 to output the causal structure 230. It can be seen that the introduction of the factor pair determining unit 121 can effectively reduce the search space of the causal relationship, thereby accelerating the discovery of the causal structure.

In some embodiments, when the causal structure 230 is determined, both the causal structure 230 and the observation sample 110 may be input into the causal structure optimizing unit 123 to further optimize the causal structure 230. The causal structure optimizing unit 123 may optimize the causal structure 230 by any known or future-developed method. In some embodiments, for example, the causal structure optimizing unit 123 may use the sparse regression algorithm to optimize the causal structure 230 determined by the causal structure searching unit 122, so as to remove some unreasonable edges from the DAG 230. In addition, the causal structure optimizing unit 123 may also change the direction of some edges in the DAG 230 and/or add some edges thereto, and so on. The causal structure optimizing unit 123 may output the optimized causal structure as the causal structure 130.

Alternatively, in some embodiments, the causal structure optimizing unit 123 may be omitted. In this case, the causal structure searching unit 122 may directly output the searched causal structure as the causal structure 130.

As shown in FIG. 2, for example, the causal structure 130 output by the causal relationship determining device 120 indicates that factor 201 is a cause of factor 206, factor 206 is a cause of factor 202 and factor 205, factor 202 is a cause of factors 203 and 205, factor 203 is a cause of factor 204, and factor 204 is a cause of factor 205. Assuming that the target factor is the factor 205, it can be determined that factors 202, 204 and 206 are causes of the target factor 205.

Figure 3:
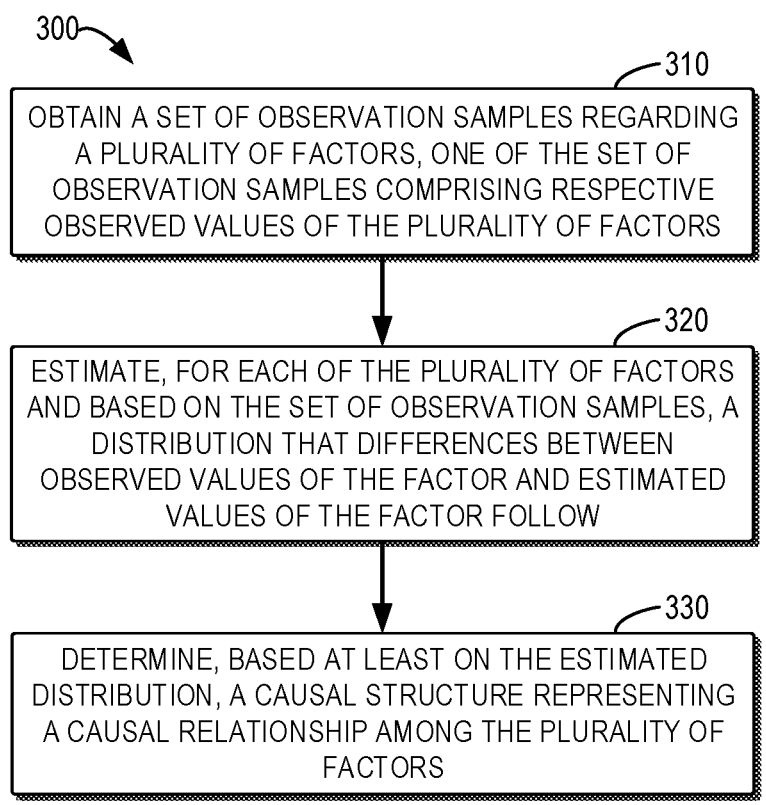
FIG. 3 illustrates a flowchart of an example method according to embodiments of the present disclosure.

FIG. 3 illustrates a flowchart of a method 300 for determining a causal relationship among a plurality of factors according to embodiments of the present disclosure. For example, the method 300 may be performed by the causal relationship determining device 120 shown in FIG. 1A. It should be appreciated that the method 300 may further include additional actions not shown and/or certain actions shown may be omitted. The scope of the present disclosure is not limited in this regard.

At block 310, the causal relationship determining device 120 obtains a set of observation samples regarding a plurality of factors (e.g., the set of observation samples 110 shown in FIG. 1A and FIG. 2). One of the set of observation samples includes respective observed values of the plurality of factors.

At block 320, the causal relationship determining device 120 estimates, for each of the plurality of factors and based on the set of observation samples 110, a distribution that differences between the observed values of the factor and estimated values of the factor follow. In some embodiments, the estimated values of the factor may be determined based on observed values of at least one other factor of the plurality of factors and an impact of the at least one other factor on the factor.

In some embodiments, for each of the plurality of factors, the causal relationship determining device 120 may estimate the impact of at least one other factor on the factor, thereby estimating the distribution that the differences between the observed values and the estimated values follow, based on the estimated impact, the observed values of the factor in the set of observation samples 110 and the respective observed values of the at least one other factor.

For example, for the $j^{th}$ factor (also referred to as "factor j") in the D factors, the vector $X_j$ may be represented as:

$$X_j = \sum_{k \neq j} \widehat{f_{j,k}}(X_k) + \varepsilon_j \quad (1)$$

where $j \in [1, D]$, $\widehat{f_{j,k}}(\cdot)$ represents the estimated impact of the $k^{th}$ factor (also referred to as "factor k") on the $j^{th}$ factor (also referred to as "factor j"), $\sum_{k \neq j} \widehat{f_{j,k}}(X_k)$ represents the estimated values of factor j in the D factors, and $\varepsilon_j$ represents a residual between the observed values and the estimated values of factor j. A probability density distribution followed by the residual may be represented as $p(x_j^{(n)} - \sum_{k \neq j} \widehat{f_{j,k}}(x_k^{(N)}))$.

In some embodiments, the causal relationship determining device 120 may estimate $\widehat{f_{j,k}}(\cdot)$ using a B-spline regression algorithm. For example, for each factor $X_k$, $\widehat{f_{j,k}}(X_k)$ may be represented as:

$$\widehat{f_{j,k}}(X_k) = \sum_{m=1}^{M} \alpha_m \varphi_m(X_K) + c \quad (2)$$

where both c and $\alpha_m$ are real numbers, $\varphi_1(\cdot), \varphi_1(\cdot), \varphi_2(\cdot) \ldots \varphi_M(\cdot)$ are B-spline basis functions. The number M of basis functions may be determined according to a preset hyper-parameter (e.g., 10) and/or the number of different values of each factor in the sample space (e.g., assuming that the value range of a certain factor may be [1,5] and is a natural number, then the number is 5). In some embodiments, for example, the number M of basis functions may be a smaller value of the preset hyper-parameter (e.g., 10) and the number of unique values for each factor.

In some embodiments, the causal relationship determining device 120 may estimate the distribution $p(x_j^{(n)} - \sum_{k \neq j} \widehat{f_{j,k}}(x_k^{(n)}))$ of the above residual $\varepsilon_j$ using the kernel density estimation algorithm. For example, the causal relationship determining device 120 may estimate the distribution of the above residual using the kernel density estimation algorithm provided by a KernSmooth open-source package. It should be appreciated that the causal relationship determining device 120 may also estimate the distribution of the above residual using any known or future-developed method. The scope of the present disclosure is not limited in this regard.

At block 330, the causal relationship determining device 120 determines, based at least on the estimated distribution, a causal structure representing a causal relationship among the plurality of factors.

In some embodiments, based on the estimated distribution, the causal relationship determining device 120 may generate an objective function for determining the causal structure. For example, the objective function may be represented as:

$$E[-\log p(X)] = \sum_{j=1}^{D}\left(-\frac{1}{N}\sum_{n=1}^{N}\log p\left(x_j^{(n)} - \sum_{k \neq j}\hat{f}_{j,k}\left(x_k^{(n)}\right)\right)\right) \quad (3)$$

It can be seen that the above objective function does not include a penalty term. In some embodiments, the causal relationship determining device 120 may determine the causal relationship among the plurality of factors by minimizing the objective function, that is:

$$\hat{\pi} \in \operatorname*{argmin}_{\pi} E[-\log p(X)] \quad (4)$$

where, $\hat{\pi}$ represents the estimated causal relationship among the plurality of factors.

In some embodiments, the causal relationship determining device 120 (e.g., the causal structure searching unit 122) may construct a D×D score matrix based on the estimated distribution to record causality scores associated with different factor pairs in the plurality of factors. It should be appreciated that since "factor k→factor j" and "factor j→factor k" indicate different causal relationships, because the two represent different factor pairs. For example, the element e(k,j) (e.g., the element of the $k^{th}$ row and $j^{th}$ column) in the score matrix may indicate that a likelihood that the element k is the element j. For example, the causal relationship among the plurality of factors may be represented using DAG, which includes a plurality of nodes corresponding to the plurality of factors. Based on the score matrix, the causal structure searching unit 122 may add, to the DAG, one or more directed edges indicating the causal relationship among the factors through a plurality of iterations, thereby obtaining the DAG representing the causal relationship among the plurality of factors.

Figure 4:
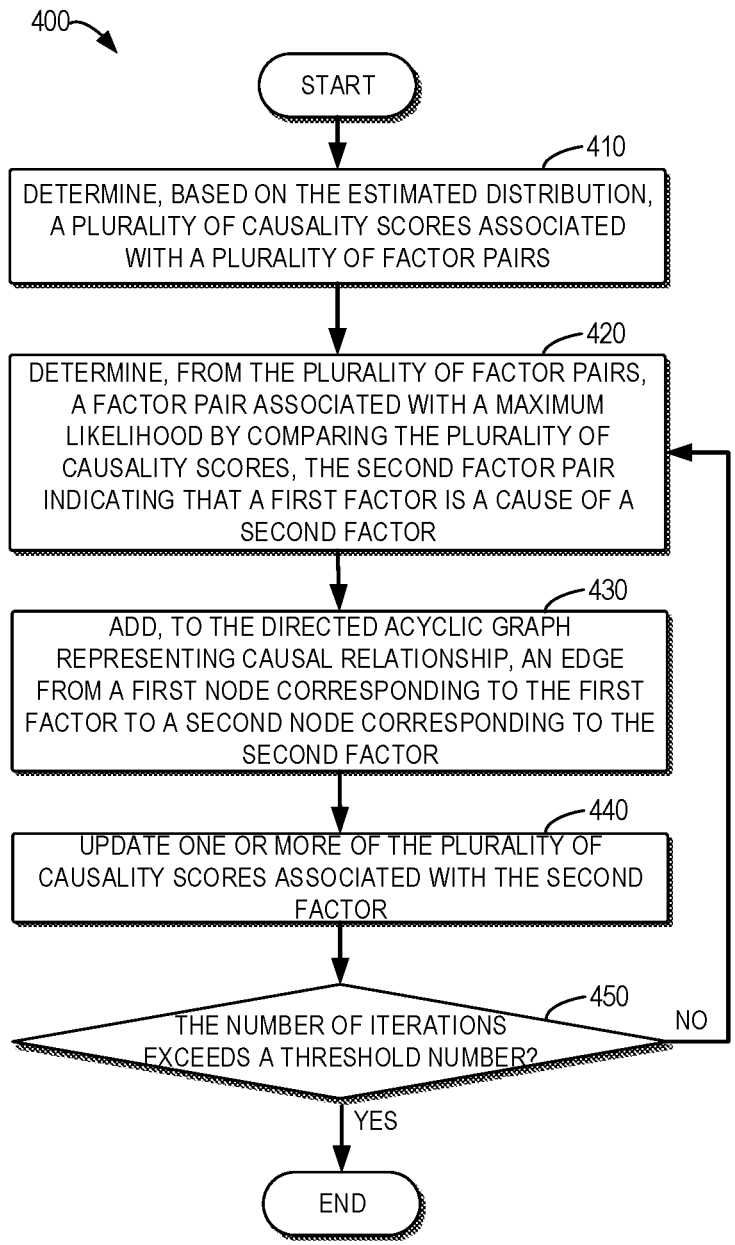
FIG. 4 illustrates a flowchart of an example method according to embodiments of the present disclosure.

FIG. 4 illustrates a flowchart of a method 400 for determining a causal structure according to embodiments of the present disclosure. For example, the method 400 may be implemented as an example of block 330 in FIG. 3. The method 400 may be performed by the causal relationship determining device 120 (e.g., the causal structure searching unit 122) shown in FIG. 1A. It should be appreciated that the method 400 may also include additional actions not shown and/or some actions shown may be omitted. The scope of the present disclosure is not limited in this regard.

At block 410, the causal relationship determining device 120 may determine, based on the estimated distribution, a plurality of causality scores (i.e., a D×D score matrix) associated with a plurality of factor pairs in the plurality of factors. For example, the element e(k,j) in the score matrix may indicate the likelihood that element k is element j. In a specific implementation, for example, the element e(k,j) in the score matrix may be a negative log-likelihood, that is, a lower score indicates a higher likelihood that the factor k is the factor j. For example, in an initial case, e(k,j) may be represented as:

$$e(k, j) = -\frac{1}{N}\sum_{n=1}^{N}\log p\left(x_j^{(n)} - f_{j,k}\left(x_k^{(n)}\right)\right) \quad (5)$$

At block 420, the causal relationship determining device 120 may determine a factor pair (namely, factor k→factor j) associated with a maximum likelihood (e.g., the element e(k,j) with the lowest score) by comparing the plurality of causality scores in the score matrix. For example, the factor pair may indicate that factor k (also referred to as "the first factor") is a cause of factor j (also referred to as "the second factor"). Then, at block 430, the causal relationship determining device 120 may add, to the DAG representing the causal relationship, an edge pointing from the first node corresponding to the first factor to the second node corresponding to the second factor.

Taking the example shown in FIG. 2 as an example, Table 1 shows a 6×6 example score matrix:

TABLE 1

Example score matrix

| Factors | 201 | 202 | 203 | 204 | 205 | 206 |
|---|---|---|---|---|---|---|
| 201 | — | ½ | 1 | 1 | 1 | ⅓ |
| 202 | ½ | — | ¼ | ½ | ⅓ | ½ |
| 203 | ½ | ½ | — | 1 | ½ | ⅓ |
| 204 | 1 | 1 | 1 | — | ⅙ | ½ |
| 205 | 1 | 1 | ⅓ | 1 | — | ½ |
| 206 | 1 | ½ | ½ | ½ | ¼ | — |

It can be seen from the score matrix shown in Table 1 that the factor pair associated with the maximum likelihood (i.e., the lowest score ⅙) is factor 204→factor 205, so an edge pointing from the node corresponding to the factor 204 to the node corresponding to the factor 205 may be added to the DAG (e.g., the DAG 230 shown in FIG. 2), to indicate that the factor 204 is a cause of the factor 205.

At block 440, the causal relationship determining device 120 may update one or more of the plurality of causality scores associated with the second factor. In the above example, the causal relationship determining device 120 may update one or more causality scores associated with the factor 205. Specifically, the causal relationship determining device 120 may recalculate each element in the fifth column in the score matrix shown in Table 1. For example, e(1, 5) may be updated to the likelihood that the combination of factors 201 and 204 is a cause of factor 205 (e.g., negative log-likelihood), e(2, 5) may be updated to the likelihood that the combination of factors 203 and 204 is a cause of factor 205, e(3, 5) may be updated to the likelihood that the combination of factors 203 and 204 is a cause of factor 205, e(4, 5) may be updated to zero, and e(6, 5) may be updated to the likelihood that the combination of factors 206 and 204 is a cause of factor 205. In addition, since it has been determined that factor 204 is the cause of factor 205, that is, it is impossible that factor 205 is a cause of factor 204, e (5, 4) may be updated to "—" to indicate that e(5, 4) need not be considered in the next the iteration.

In some embodiments, the score associated with factor j may be calculated as follows:

$$-\frac{1}{N}\sum_{n=1}^{N}\log p\left(x_j^{(n)} - \sum_{k\neq j}f_{j,k}(x_k^{(n)})\right) \quad (6)$$

In the above example, when e(1, 5) is updated, j=5 and k ∈ [1,4] in formula (6); when e(2, 5) is updated, j=5 and k∈[2,4] in formula (6); when e(3, 5) is updated, j=5 and k∈[3,4] in formula (6); when e(6, 5) is updated, j=5 and k∈[6, 4] in formula (6).

At block 450, the causal relationship determining device 120 determines whether the number of iterations reaches a threshold number. In some embodiments, the threshold number may be determined based on the number of the plurality of factor pairs. For example, for D factors, the number of different factor pairs is D (D−1), then the threshold number may be D (D−1)/2. This is because when it is determined that the factor k is a cause of the factor j, it may be simultaneously determined that the factor j is not a cause of the factor k. That is, the corresponding element in the score matrix may be updated to "—" to indicate that factor j→factor k need not be considered in the next iteration.

As shown in FIG. 4, when the number of iterations has not reached the threshold number, the method 400 may proceed to 420 for the next iteration. Otherwise, the causal relationship determining device 120 may output a DAG indicating the causal relationship among the plurality of factors.

It may be proved through the above description and experiments that the embodiments of the present disclosure can accurately and robustly discover the causal relationship among the plurality of factors without making any assumptions about the relationship between the data distribution and the factors. Compared with the conventional solution, the causal structure discovered by the embodiments of the present disclosure has a higher accuracy and recall rate, and is closer to the actual causal relationship among the plurality of factors.

Figure 5:
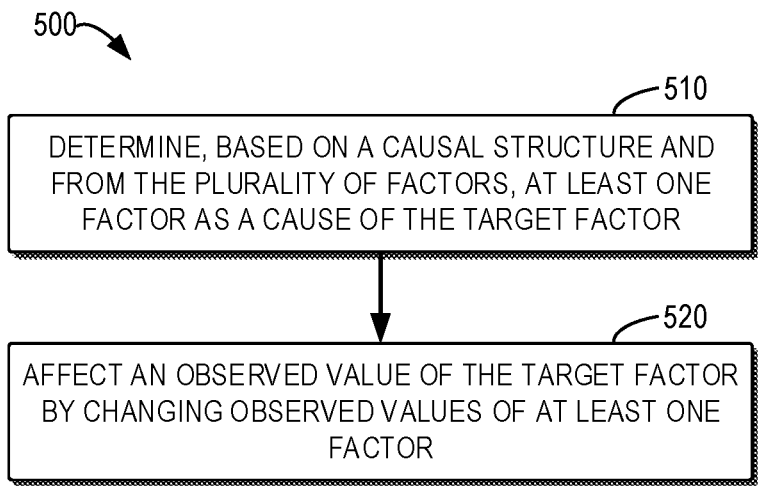
FIG. 5 illustrates a flowchart of an example method according to embodiments of the present disclosure.

FIG. 5 illustrates a flowchart of a method 500 for affecting an observed value of a target factor according to embodiments of the present disclosure. For example, the method 500 may be performed by the observation sample affecting device 140 shown in FIG. 1B. In some embodiments, the method 500 may be performed after the method 300. It should be appreciated that the method 500 may also include additional actions not shown and/or certain actions shown may be omitted. The scope of the present disclosure is not limited in this regard.

At block 510, the observation sample affecting device 140 determines, based on a causal structure and from a plurality of factors, at least one factor as a cause of a target factor. Then, at block 520, the observation sample affecting device 140 affects an observed value of the target factor by changing the observed value of the at least one factor. In some embodiments, for example, the observation sample affecting device 140 may affect the observed value of the target factor by affecting and changing at least one factor and/or making a corresponding strategy for the at least one factor.

Taking the above scenario of subscriber satisfaction with a telecommunications operator as an example, for example, the target factor is "subscriber satisfaction." Based on the causal structure 130, the observation sample affecting device 140 may determine which factors (e.g., a reminder before the service bundle runs out, benefit service bundle, and the like) are causes of the target factor "subscriber satisfaction."

The observation sample affecting device 140 may further improve the subscriber's satisfaction with the telecommunications provider by affecting and changing these factors, and/or making corresponding policies (e.g., providing more reminders to the subscriber before the service bundle runs out, or providing more benefit service bundles to the subscriber) with respect to these factors.

Taking the above scenario regarding the patient's blood pressure as an example, the target factor for example is "blood pressure." Based on the causal structure 130, the observation sample affecting device 140 may determine which physiological indexes are causes of the target factor "blood pressure." The observation sample affecting device 14 may further make the patient's blood pressure remain stable by affecting and changing these physiological indexes, and/or making corresponding polices with respect to these physiological indexes.

Taking the above scenario of commodity sales as an example, the target factor for example is "umbrella sales." Based on the causal structure 130, the observation sample affecting device 140 may determine which factors (e.g., weather, the number of umbrellas for sale, and the like) are causes of the target factor "umbrella sales." The observation sample affecting device 140 may further improve the sales volume of the target commodity umbrella by affecting and changing these factors, and/or making corresponding polices (e.g., increasing the number of umbrellas for sale when it rains) with respect to these factors.

Taking the above scenario of software development as an example, the target factor for example is "development cycle." Based on the causal structure 130, the observation sample affecting device 140 may determine which factors (e.g., the number of architecture levels, programming language, and the like) are causes of the target factor "development cycle." The observation sample affecting device 140 may further reduce the software development cycle by affecting and changing these factors, and/or making corresponding polices (e.g., reducing the complexity of the software architecture, using a more friendly programming language, and the like) with respect to these factors. Again for example, the target factor may be "a failure rate of software in the running stage." Based on the causal structure 130, the observation sample affecting device 140 may determine which factors (e.g., the length of code, the number of modules, and the like) are causes of the target factor "a failure rate of software in the running stage." The observation sample affecting device 140 may further reduce the failure rate of software in the running stage by affecting and changing these factors, and/or making corresponding polices (e.g., reducing the length of code, and decreasing the number of modules, and the like) with respect to these factors.

Figure 6:
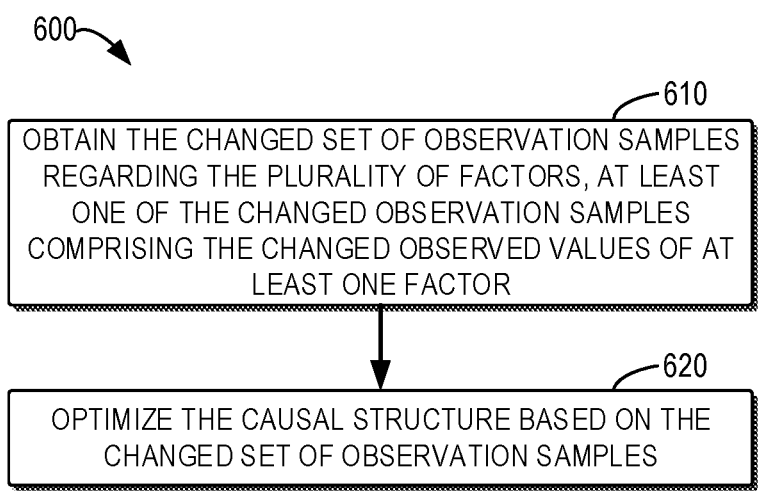
FIG. 6 illustrates a flowchart of an example method according to embodiments of the present disclosure.

FIG. 6 illustrates a flowchart of a method 600 for optimizing the causal relationship according to embodiments of the present disclosure. For example, the method 600 may be performed by the causal relationship optimizing device 160 shown in FIG. 1B. In some embodiments, the method 600 may be performed after the method 500. It should be understood that the method 600 may also include additional actions not shown and/or certain actions shown may be omitted. The scope of the present disclosure is not limited in this regard.

At block 610, the causal relationship optimizing device 160 obtains the changed set of observation samples regarding the plurality of factors. In some embodiments, at least one of the changed set of observation samples may include the changed observed values of at least one factor (e.g., at least one factor is the cause of the target factor). Then, at block 620, the causal relationship optimizing device 160 may optimize the causal structure based on the changed set of observation samples. In some embodiments, for example, the causal relationship optimizing device 160 may rediscover the causal relationship among the plurality of factors based on the changed set of observation samples 150 (e.g., similar to the process performed by the causal relationship determining device 120), thereby obtaining an optimized causal structure. In this way, the embodiments of the present disclosure can further improve the accuracy and robustness of causal discovery.

Figure 7:
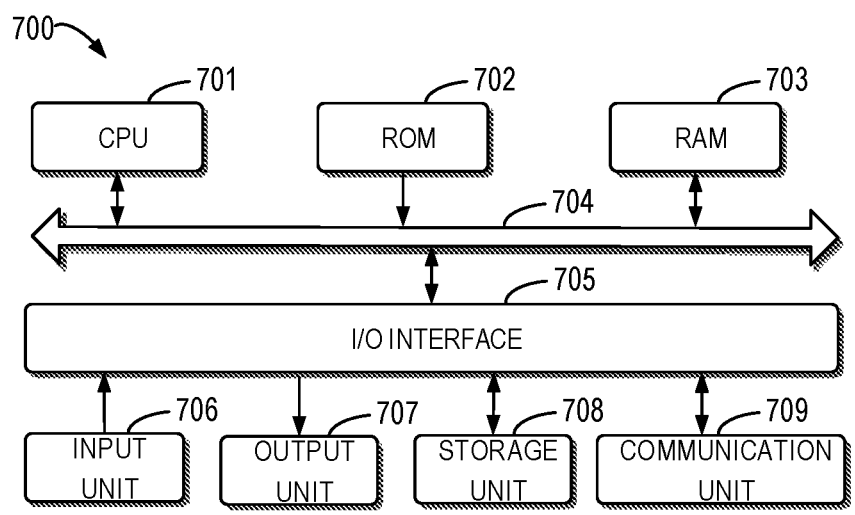
FIG. 7 illustrates a schematic block diagram of an example device that may be used to implement embodiments of the present disclosure.

FIG. 7 illustrates a block diagram of an example device 700 adapted to implement embodiments of the present disclosure. For example, the causal relationship determining device 120 shown in FIG. 1A, the observation sample affecting device 140 and/or the causal relationship optimizing device 160 shown in FIG. 1B may be implemented by the device 700. As shown in FIG. 7, the device 700 includes a central processing unit (CPU) 701 that may perform various appropriate actions and processing based on computer program instructions stored in a read-only memory (ROM) 702 or computer program instructions loaded from a storage unit 708 to a random access memory (RAM) 703. In the RAM 703, there further store various programs and data needed for operations of the device 700. The CPU 701, ROM 702 and RAM 703 are connected to each other via a bus 704. An input/output (I/O) interface 705 is also connected to the bus 704.

Various components in the device 700 are connected to the I/O interface 705, including: an input unit 706, for example, a keyboard, a mouse, and the like; an output unit 707 including various kinds of displays and a loudspeaker, and the like; a storage page 708 including a magnetic disk, an optical disc, and the like; a communication unit 709 including a network card, a modem, and a wireless communication transceiver, and the like. The communication unit 709 allows the device 700 to exchange information/data with other devices through a computer network such as the Internet and/or various kinds of telecommunications networks.

Various processes and processing described above, e.g., the method 300, 400, 500 and/or 600 may be performed by the processing unit 701. For example, in some embodiments, the method 300, 400, 500 and/or 600 may be implemented as a computer software program that is tangibly included in a machine-readable medium, e.g., the storage unit 708. In some embodiments, part or the entire computer program may be loaded and/or mounted onto the device 700 via the ROM 702 and/or communication unit 709. When the computer program is loaded to the RAM 703 and executed by the CPU 701, one or more steps of the method 300, 400, 500 and/or 600 as described above may be performed.

The present disclosure may be a system, a method and/or a computer program product. The computer program product may include a computer-readable storage medium on which computer-readable program instructions for executing various aspects of the present disclosure are loaded.

The computer-readable storage medium may be a tangible device that may retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on a user's computer, partly on the user's computer, as a stand-alone software package, partly on the user's computer and partly on a remote computer or entirely on the remote computer or a server. In the latter scenario, the remote computer may be connected to the user's computer through any type of network, including a local area network (LAN) or a wide area network (WAN), or the connection may be made to an external computer (e.g., through the Internet using an Internet service provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the disclosure. It will be appreciated that each block of the flowchart illustrations and/or block diagrams, and combinations of blocks in the flowchart illustrations and/or block diagrams, may be implemented by computer-readable program instructions.

These computer-readable program instructions may be provided to a processing unit of a general-purpose computer, a special-purpose computer, or other programmable data processing device to produce a machine, such that the instructions, which execute via the processor of the computer or other programmable data processing device, create means for implementing the functions/acts specified in the flowchart and/or block diagram block or blocks. These computer-readable program instructions may also be stored in a computer-readable storage medium that may direct a computer, a programmable data processing device, and/or other devices to function in a particular manner, such that the computer-readable storage medium having instructions stored thereon includes an article of manufacture including instructions which implement aspects of the functions/acts specified in the flowchart and/or block diagram block or blocks.

The computer-readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a reverse order, depending upon the functionality involved. It should also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for the purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of data processing, comprising:
    obtaining a set of observation samples regarding a plurality of factors, one of the set of observation samples comprising respective observed values of the plurality of factors;
    estimating, for each of the plurality of factors and based on the set of observation samples, a distribution that differences between observed values of the factor and estimated values of the factor follow, the estimated values being determined based on observed values of at least one other factor of the plurality of factors and an impact of the at least one other factor on the factor; and
    determining, based at least on the estimated distribution, a causal structure representing a causal relationship among the plurality of factors.

2. The method according to claim 1, wherein the plurality of factors comprise a target factor, and the method further comprises:
    determining, based on the determined causal structure and from the plurality of factors, at least one factor as a cause of the target factor; and
    affecting an observed value of the target factor by changing observed values of the at least one factor.

3. The method according to claim 2, further comprising:
    obtaining the changed set of observation samples regarding the plurality of factors, at least one of the changed set of observation samples comprising the changed observed values of the at least one factor; and
    optimizing the causal structure based on the changed set of observation samples.

4. The method according to claim 1, wherein estimating the distribution comprises:
    estimating the impact of the at least one other factor on the factor; and
    estimating the distribution based on the impact, observed values of the factor in the set of observation samples, and observed values of the at least one other factor.

5. The method according to claim 4, wherein estimating the impact comprises:
    estimating the impact using a B-spline regression algorithm.

6. The method according to claim 4, wherein estimating the distribution comprises:
    estimating the distribution using a kernel density estimation algorithm.

7. The method according to claim 1, wherein the distribution is different from a Gaussian distribution.

8. The method according to claim 1, wherein determining the causal structure comprises:
    generating, based on the distribution, an objective function for determining the causal to structure, a penalty term being absent from the objective function; and
    determining the causal structure by minimizing the objective function.

9. The method according to claim 1, wherein the causal structure is represented by a directed acyclic graph, the directed acyclic graph comprises a plurality of nodes corresponding to the plurality of factors, and determining the causal structure comprises:
    determining, based on the distribution, a plurality of causality scores associated with a plurality of factor pairs in the plurality of factors, wherein a causality score of a first factor pair in the plurality of factor pairs indicates a likelihood that one factor in the first factor pair is a cause of the other factor in the first factor pair; and
    iteratively performing the following operations until the number of iterations reaches a threshold number:
        determining, from the plurality of factor pairs, a second factor pair associated with a maximum likelihood by comparing the plurality of causality scores, the second factor pair indicating that a first factor in the second factor pair is a cause of a second factor in the second factor pair;
        adding, to the directed acyclic graph, an edge from a first node corresponding to the first factor to a second node corresponding to the second factor; and updating one or more of the plurality of causality scores associated with the second factor.

10. The method according to claim 9, wherein the threshold number is determined based on the number of the plurality of factor pairs.

11. The method according to claim 9, further comprising:
determining, from the plurality of factors, two factors that are likely to have a causal relationship as one of the plurality of factor pairs.

12. The method according to claim 9, further comprising:
optimizing edges in the directed acyclic graph using a sparse regression algorithm.

13. A device for data processing, comprising:
at least one processor configured to
obtain a set of observation samples regarding a plurality of factors, one of the set of observation samples comprising respective observed values of the plurality of factors;
estimate, for each of the plurality of factors and based on the set of observation samples, a distribution that differences between observed values of the factor and estimated values of the factor follow, the estimated values being determined based on observed values of at least one other factor of the plurality of factors and an impact of the at least one other factor on the factor; and
determine, based at least on the estimated distribution, a causal structure representing a causal relationship among the plurality of factors.

14. The device according to claim 13, wherein the plurality of factors comprise a target factor, and the at least one processor is further configured to:
determine, based on the determined causal structure and from the plurality of factors, at least one factor as a cause of the target factor; and
affect an observed value of the target factor by changing observed values of the at least one factor.

15. The device according to claim 14, wherein the at least one processor is further configured to:
obtain the changed set of observation samples regarding the plurality of factors, at least one of the changed set of observation samples comprising the changed observed values of the at least one factor; and
optimize the causal structure based on the changed set of observation samples.

16. The device according to claim 13, wherein the at least one processor is further configured to:
estimate the impact of the at least one other factor on the factor; and
estimate the distribution based on the impact, observed values of the factor in the set of observation samples, and observed values of the at least one other factor.

17. The device according to claim 16, wherein the at least one processor is further configured to:
estimate the impact using a B-spline regression algorithm.

18. The device according to claim 16, wherein the at least one processor is further configured to:
estimate the distribution using a kernel density estimation algorithm.

19. The device according to claim 13, wherein the distribution is different from a Gaussian distribution.

20. The device according to claim 13, wherein the at least one processor is further configured to:
generate, based on the distribution, an objective function for determining the causal structure, a penalty term being absent from the objective function; and
determine the causal structure by minimizing the objective function.

21. The device according to claim 13, wherein the causal structure is represented by a directed acyclic graph, the directed acyclic graph comprises a plurality of nodes corresponding to the plurality of factors, and the at least one processor is further configured to:
determine, based on the distribution, a plurality of causality scores associated with a plurality of factor pairs in the plurality of factors, wherein a causality score of a first factor pair in the plurality of factor pairs indicates a likelihood that one factor in the first factor pair is a cause of the other factor in the first factor pair; and
iteratively perform the following operations until the number of iterations reaches a threshold number:
determine, from the plurality of factor pairs, a second factor pair associated with a maximum likelihood by comparing the plurality of causality scores, the second factor pair indicating that a first factor in the second factor pair is a cause of a second factor in the second factor pair;
add, to the directed acyclic graph, an edge from a first node corresponding to the first factor to a second node corresponding to the second factor; and
update one or more of the plurality of causality scores associated with the second factor.

22. The device according to claim 21, wherein the threshold number is determined based on the number of the plurality of factor pairs.

23. The device according to claim 21, where the at least one processor is further configured to:
determine, from the plurality of factors, two factors that are likely to have a causal relationship as one of the plurality of factor pairs.

24. The device according to claim 21, wherein the acts further comprise:
optimize edges in the directed acyclic graph using a sparse regression algorithm.

25. A non-transitory computer-readable storage medium having machine-executable instructions stored thereon which, when executed by a device, cause the device to perform the method according to claim 1.

* * * * *